Nov. 5, 1940.    J. H. KOEBEL    2,220,338

CULTIVATOR SHIELD CONTROL

Filed Nov. 16, 1939    2 Sheets-Sheet 1

Inventor:
Joseph H. Koebel
By: Tefft & Tefft
Attys.

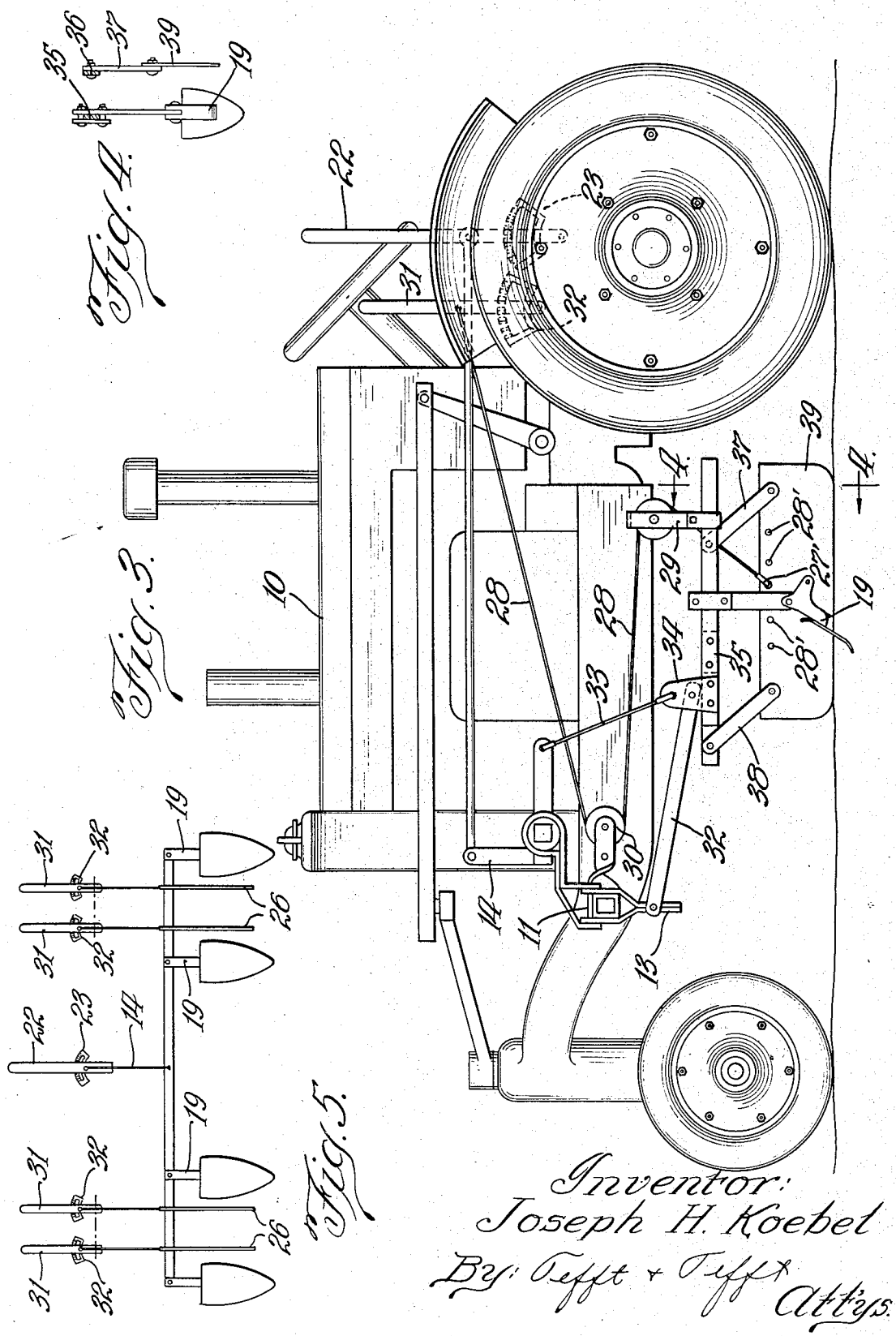

Patented Nov. 5, 1940

2,220,338

UNITED STATES PATENT OFFICE 2,220,338

CULTIVATOR SHIELD CONTROL

Joseph H. Koebel, Rock Island, Ill.

Application November 16, 1939, Serial No. 304,679

3 Claims. (Cl. 97—188)

This invention relates to cultivator shields as used for corn cultivators, and particularly to the mechanism for adjusting and controlling the shields on a tractor cultivator.

Cultivator shields have been used for many years on horse drawn cultivators, and their adjustments and functions are well known. However, with the advent of tractor drawn cultivators new conditions arose which the old arrangement of shields failed to meet successfully.

In explanation, it will be appreciated that tractor drawn cultivators travel at a considerably higher rate of speed than horse drawn cultivators. This higher rate of speed throws clods and soil further and harder, thus increasing the need for proper shielding. The great increase in power afforded by tractor cultivators and their general operation permits the operator to raise and lower the beams and shovels more sharply and abruptly, usually while the tractor is in motion. These changed conditions in all variety of ground conditions, such as wet ground, dry ground, or lumpy, cloddy soil, increase the need for effective shield control, as will be readily appreciated. It will further be appreciated that tractor operators cannot stop and uncover hills of corn buried by the ploughed soil, as was the custom with horse drawn cultivators. All these factors increase the damage hazard of cultivating, which suggests the need for better shield control for tractor cultivation.

The particular object of this invention is to provide shield control mechanism for cultivators which will permit each shield to be adjusted independently, or all shields to be raised together with the cultivator shields,—and in addition, to provide another adjustment whereby the movement of the shields with respect to the beams and shovels may be varied to fit ground or cultivating conditions.

Other objects and benefits will be disclosed in the following descriptions and drawings in which:

Fig. 3 is a side elevation view of a tractor cultivator equipped with the newer type of parallel movement beams and my cultivator shield control device;

Fig. 4 is a cross sectional end elevation view as it would appear on the section lines 4—4 of Fig. 3 to better disclose the arrangement of the offset shield beam, as will later be explained; and Fig. 5 is a diagrammatic view showing the arrangement of beams, shovels, and shields, as will later be explained in detail.

Figure 1:
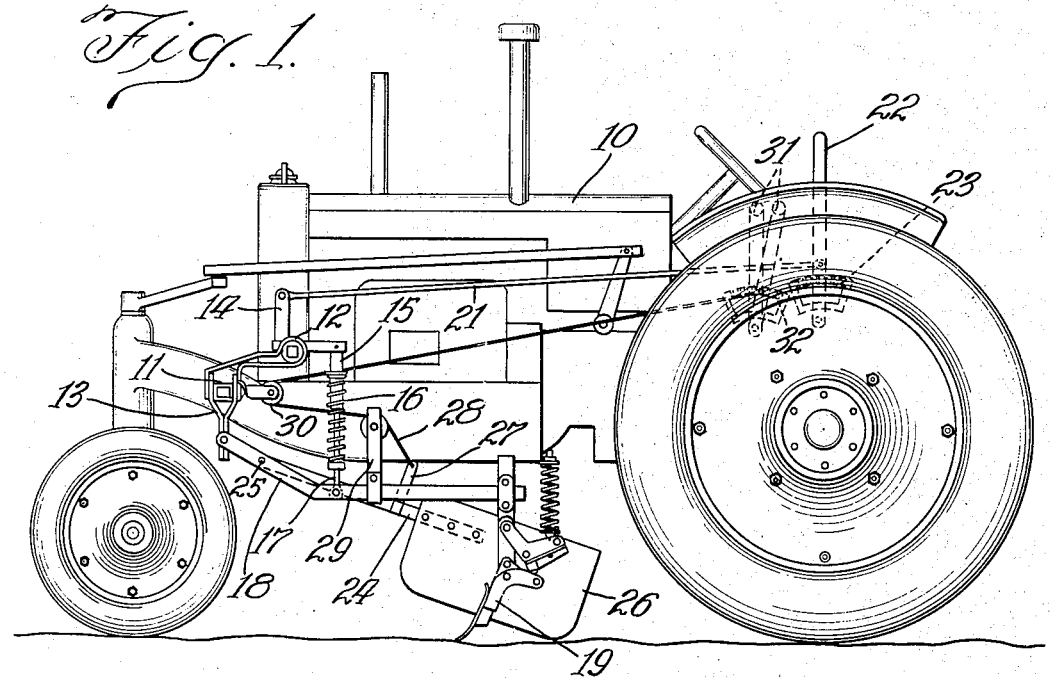
Fig. 1 is a side elevation view of a conventional type of tractor cultivator showing the cultivator beams and shields in lowered position about to enter the ground as controlled by my shield control device.
Figure 2:
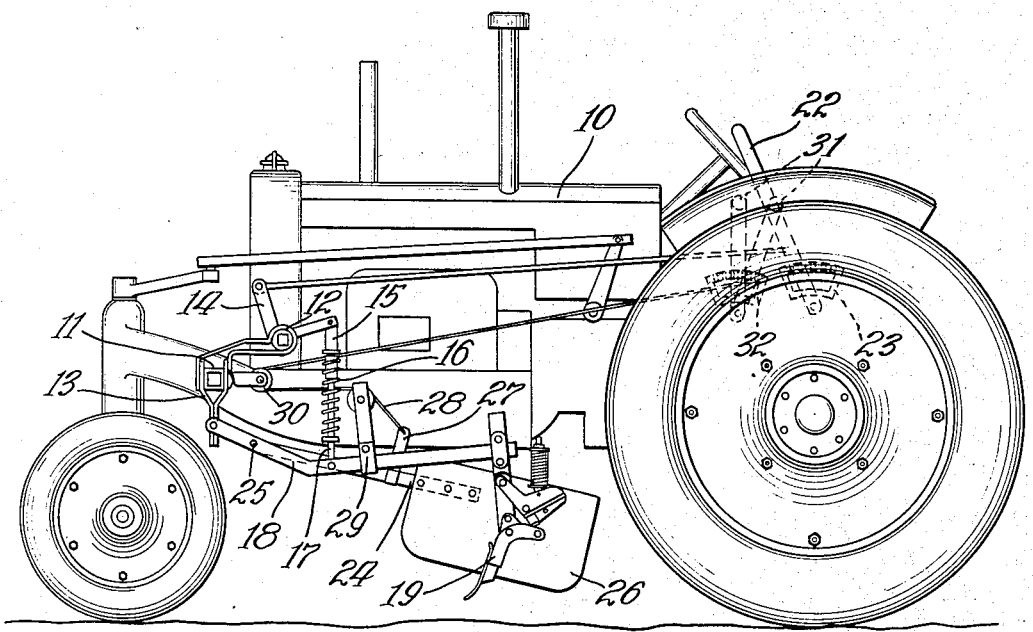
Fig. 2 is a similar view to Fig. 1 except showing the cultivator beams and shields in raised position.

Now referring to the drawings and at the outset particularly to Figs. 1 and 2, I designate 10 the conventional tractor 10 on which is mounted a draw bar 11 supporting a series of adjustment brackets 12 and beam brackets 13. It will be understood that there are brackets 12 and 13 for each cultivator beam.

Pivotally mounted on the brackets 12 are bell cranks 14 having beam actuating mechanism on the opposite end of the bell cranks consisting of the pivotal casting 15 carrying the compression spring 16 slidably mounted on the link 17 pivotally attached to the beam 18.

Mounted on the cultivator beams 18 are conventional shovel shank members 19 carrying conventional cultivator shovels. The bell cranks 14 are actuated in unison by a rod 21 and the lever 22 pivotally mounted on the tooth adjustment bracket 23.

It will be appreciated that by the foregoing structure all the cultivator beams may be raised or lowered in unison by means of the lever 22.

Pivotally attached at 25 on the cultivator beams 18 are the shield arms 24 carrying conventional cultivator shields 26. Attached to the shield arms 24 are rope brackets 27 to which are attached flexible wire ropes 28 which pass over the adjustable sheave member 29 through the pulleys 30 from whence they are attached to shield levers 31 pivotally mounted on tooth adjustment brackets 32. It will be appreciated that by this structure each shield can be adjusted independently by movement of the lever 31 and set by the adjustment bracket 32. This permits the adjustment of each shield independently by the operator.

The general arrangement of adjustment levers is diagrammatically shown in Fig. 5, and with the above explanation and this diagram it is believed that the adjustments and control of my shovels and shields will be well understood. As a matter of fact, all of the above controls as outlined and explained are somewhat conventional and will be so recognized and appreciated.

Now referring to the drawings and particularly to the adjustable sheave bracket 29, it will be understood that this sheave bracket is adjustable forward or backward on the beams 18. As shown in Fig. 1, the bracket 29 is quite close to the rope brackets 27, and, therefore, as the beam 18 moves pivotally upward it will carry almost directly the bracket 27 and the shield 26 by reason of this close position and the direct pull of the wire rope 28. However, if the adjustable sheave bracket is moved forward and away from the bracket 27 when the beams are moved upward, the rope brackets 27 and shields 26 will not be moved by the same corresponding movement of the beams but will lag behind by reason of the separated position of the brackets 29 and 27 and the indirect pull of the rope 28. It will, therefore, be appreciated that by adjusting the bracket 29 in relation to the bracket 27 or by any arrangement whereby these brackets are separated, I provide mechanism whereby the movement of the shields with respect to the beams and shovels may be varied.

By this arrangement it is possible to provide an adjustment whereby as the shovels are raised out of the ground the shields do not rise directly but lag somewhat behind the movement of the shovels and thus catch any rolling clods or earth which might otherwise cover or injure hills of corn. Likewise, on reverse movement as the cultivator beams are lowered, the shields advance ahead of the shovels and thus protect the corn. As each of my shields are independently controlled, it is possible for me to arrange any of my shields to lag behind the movement of the shovels, an arrangement which is particularly advantageous when cultivating hillsides.

Now referring to Fig 3, I show a more modern arrangement of cultivator beams This arrangement of beams and shields provides for a comparatively parallel movement of the beams and shields with relation to the ground as contrasted with tht older pivotal arc movement, as illustrated in Figs. 1 and 2. Attached to the draw bracket 13 is a pivotal arm 32 which pivotally attaches to a bracket clip 34 fixed to the short parallel cultivator beam 35. This beam is supported by the pivotal rod 33 attached to the bell crank 14. As better shown in Fig. 4, a shield beam 36 is offset from and carried by the cultivator beam 35. Pivotally attached to this beam 36 are parallel shield arms 37 carrying a horizontal shield 39. The sheave bracket 29, as described in Figs. 1 and 2, is carried on the cultivator beam 35 and the wire rope 28 passing through the sheave bracket 29 attaches directly to the shield 39 at 27'. The sheave bracket 29, as described for Figs. 1 and 2, may be adjusted forward or rearward on the beam 35 and the attachment of the wire rope 28 may be adjusted with respect to its attachment to the shield 39 at various points 28', as illustrated.

Similarly as described for Figs. 1 and 2, when the adjustable sheave bracket 29 is moved away from the attachment point 27' the movement of the shield 39 will lag behind the movement of the beams and the closer the bracket 29 is to the point 27', the closer will the shields 39 move with the beams 35.

It will be appreciated that by this structure both the beams 35 and the shields 39 move approximately parallel with the ground. This newer structure and parallel movement is better adapted for tractor cultivation by reason of the parallel movement of the shields and the vertical movement of the shovels with respect to the ground, because by this arrangement there is maintained a more constant relation than is provided with the pivotal arc movement as illustrated in Figs. 1 and 2, and, therefore, better control is provided. However, as explained, by the adjustment of the sheave bracket 29, I provide means whereby the shields 39 will lag behind the shovels as they raise out of the ground and will precede the shovels as they are lowered into the ground. Thus better protection under the new conditions of cultivating with a tractor, as heretofore explained, is provided.

Having thus explained my invention, I claim:

1. In a cultivator shield control device, a draw bar, a pair of cultivator beams pivotally mounted with respect to said draw bar, a cultivator shovel attached to each of said cultivator beams at a point remote from the pivotal connection of said cultivator beam, a plurality of shield arms, each including a pivotal mounting and a free end, a pair of shields secured to the free ends of said shield arms, said pair of shields being spaced apart from each other and positioned between the aforementioned pair of cultivator beams, a manual cultivator beam adjusting device to alter the elevational position of the shovels, an automatic shield control responsive to elevational movement of the cultivator beam to alter the elevational position of the shields, and differential adjustment means for said automatic shield control, said means including a variable coupling having shiftable devices to alter the effective leverage between the cultivator beams and the shields to cause unequal movement of said beams and shields, whereby the movement of the shields will be retarded and lag behind the movement of the cultivator beams as said beams are raised, and will be advanced ahead of said cultivator beams as they are lowered.

2. In a cultivator shield control device, a draw bar, a pair of cultivator beams pivotally mounted with respect to said draw bar, a cultivator shovel attached to each of said cultivator beams at a point remote from the pivotal connection of said cultivator beam, a plurality of shield arms, each including a pivotal mounting and a free end, a pair of shields secured to the free ends of said shield arms, said pair of shields being spaced apart from each other and positioned between the aforementioned pair of cultivator beams, a manual cultivator beam adjusting device to alter the elevational position of the shovels, an automatic shield control responsive to elevational movement of the cultivator beam to alter the elevational position of the shields, and differential adjustment means for said automatic shield control, and means including a variable coupling having shiftable devices to alter the effective leverage between the cultivator beams and the shields, said variable coupling including a cable, a stationary sheave, and a control shave.

3. In a cultivator shield control device, a draw bar, a pair of cultivator beams pivotally mounted with respect to said draw bar, a cultivator shovel attached to each of said cultivator beams at a point remote from the pivotal connection of said cultivator beam, a plurality of shield arms, each including a pivotal mounting and a free end, a pair of shields secured to the free ends of said shield arms, said pair of shields being spaced apart from each other and positioned between the aforementioned pair of cultivator beams, a manual cultivator beam adjusting device to alter the elevational position of the shovels, an automatic shield control responsive to elevational movement of the cultivator beam to alter the elevational position of the shields, and differential adjustment means for said automatic shield control, said means including a length of cable extending from the shield-arms to a stationary sheave, a control sheave attached to the cultivator beam and in contacting relationship with said cable length at a point intermediate said shield-arm and said first-mentioned stationary sheave, said differential adjustment means including a shiftable device to shift the relative positions of the cable length and control sheave to cause unequal movements of the shield-arms responsive to equal units of movement of the cultivator bars.

JOSEPH H. KOEBEL.